June 17, 1969    G. KOPP    3,450,348
DUAL DRIVE FOR SWIVELING NOZZLES
Filed July 3, 1967    Sheet 1 of 7

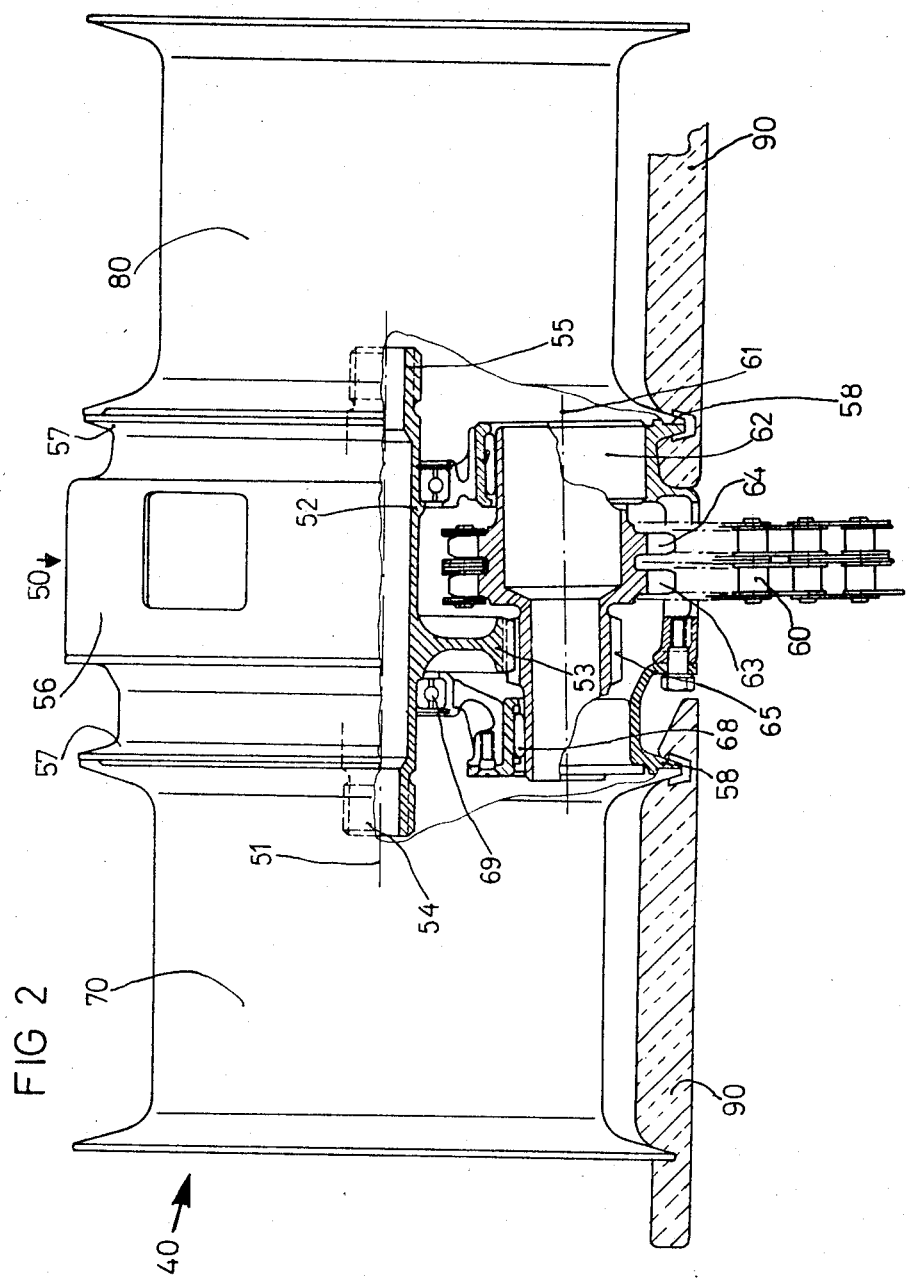

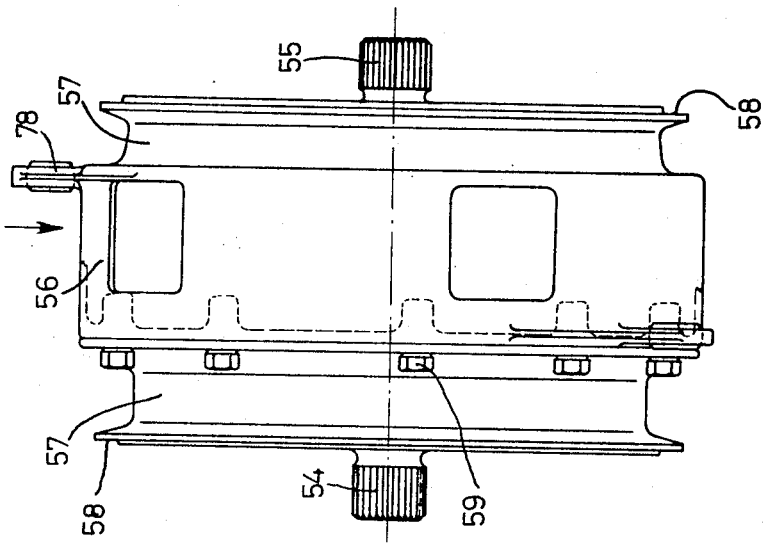
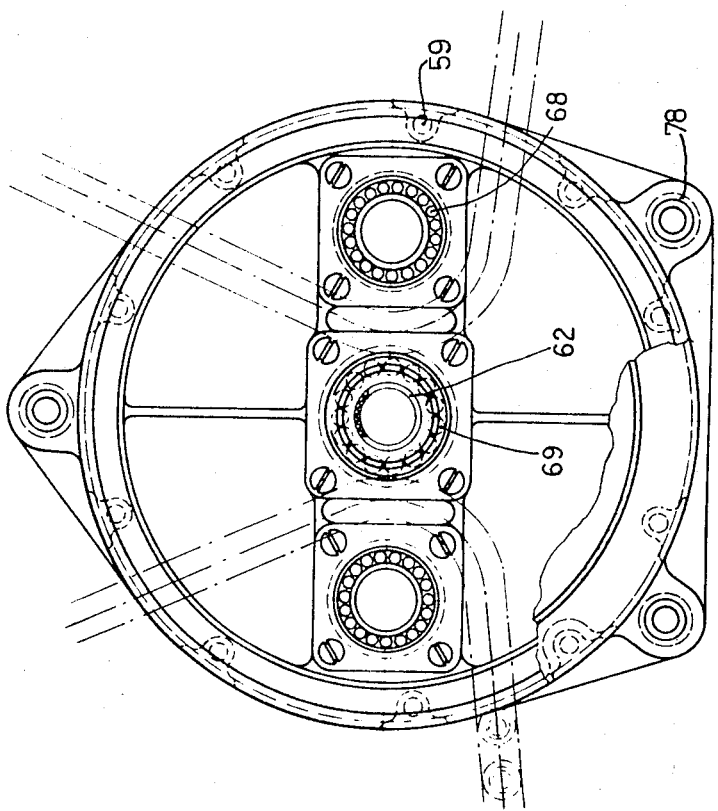

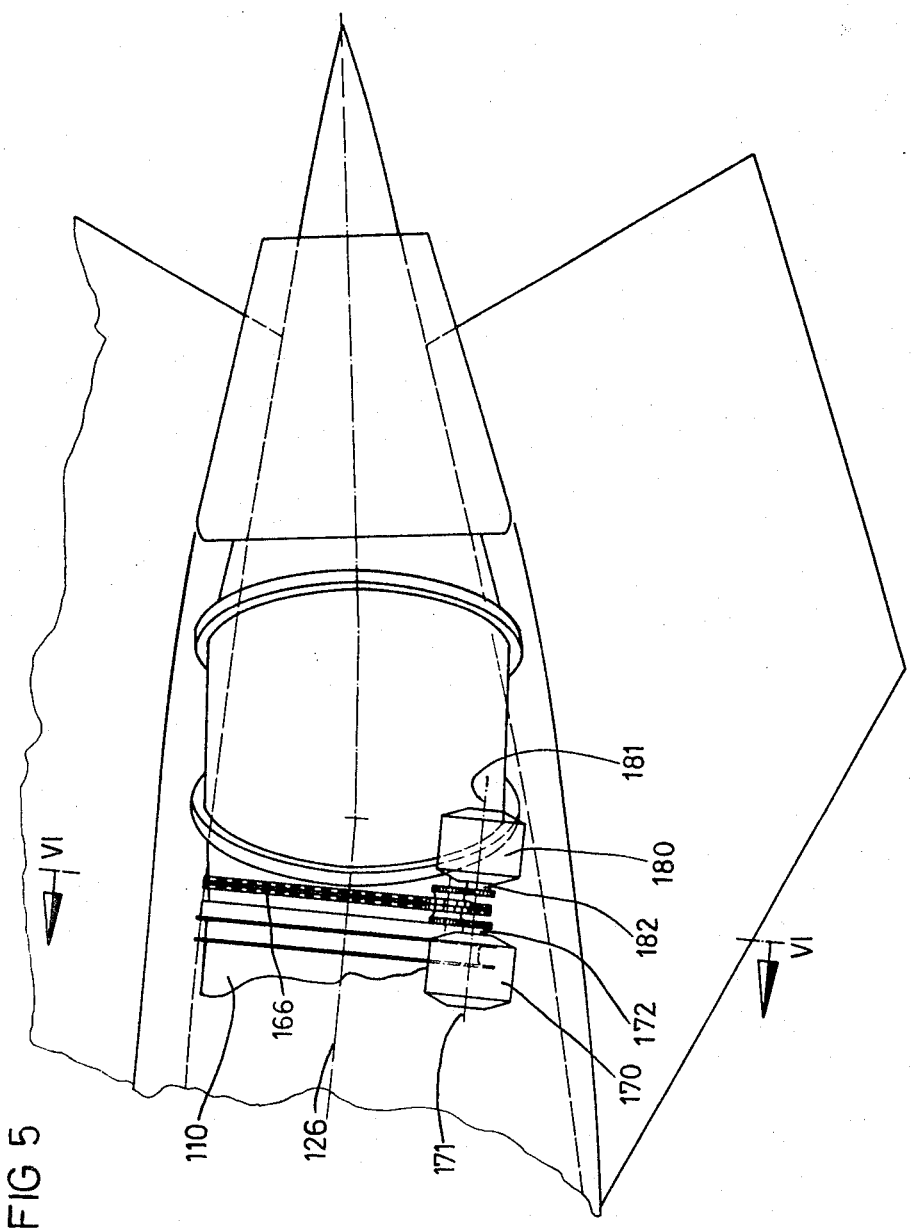

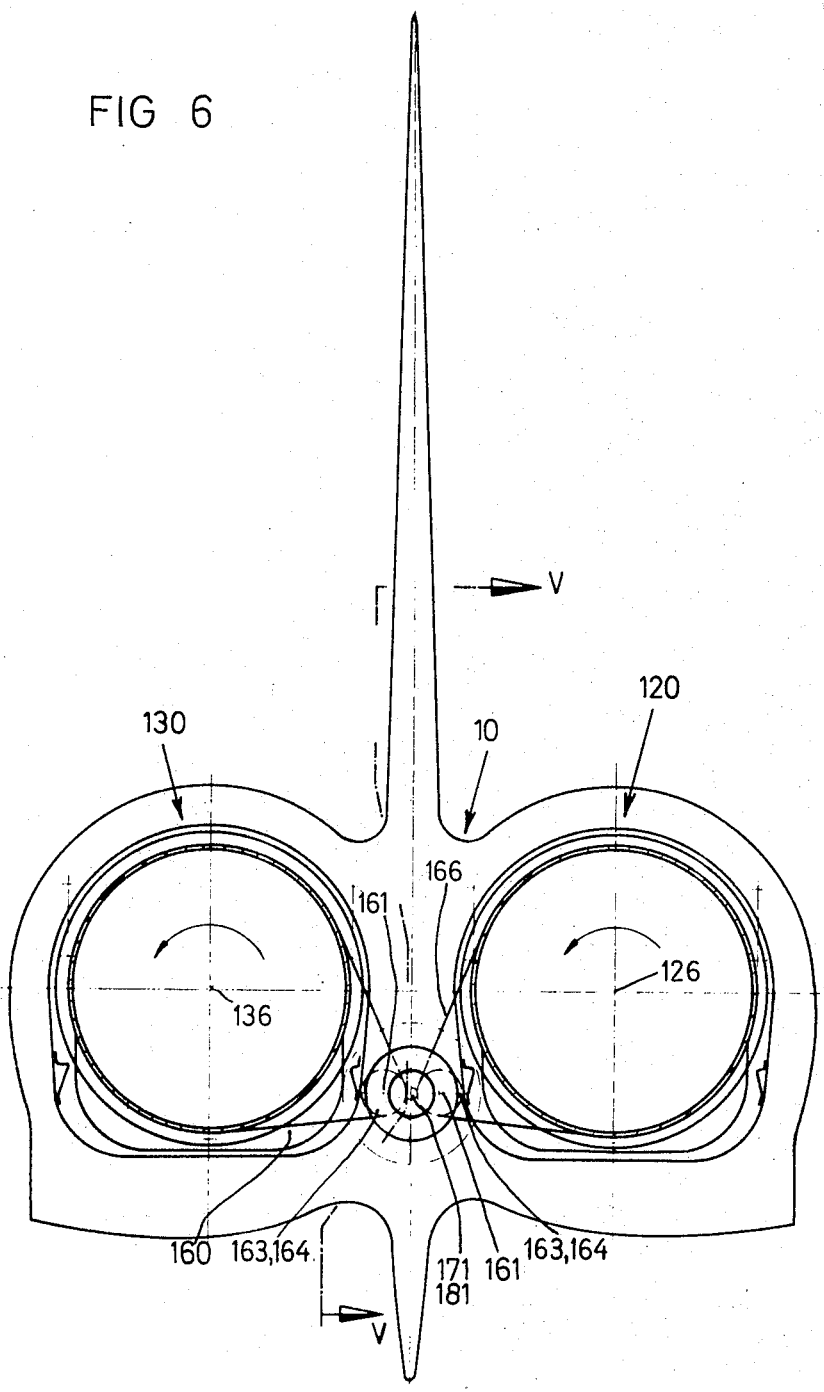

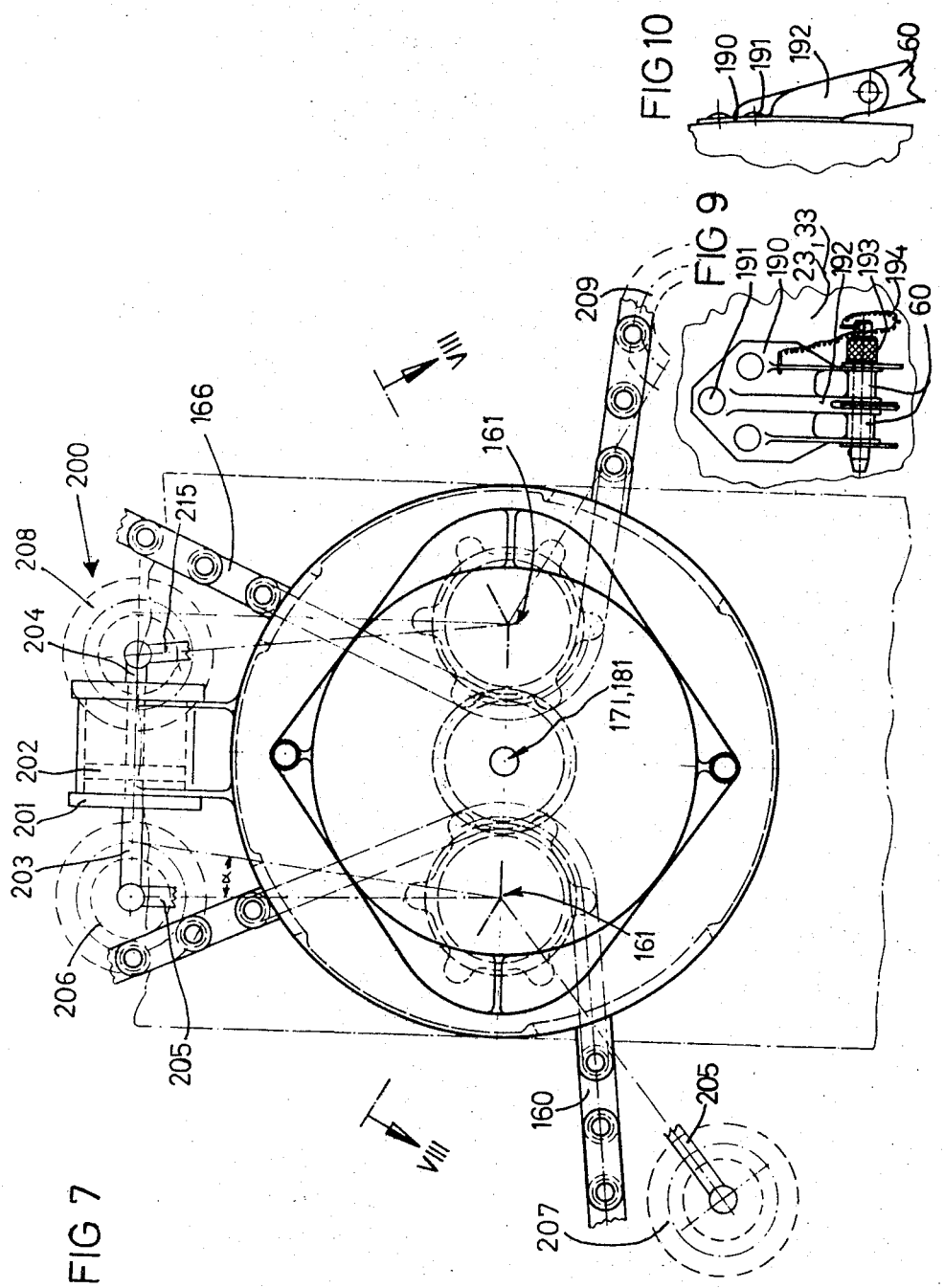

United States Patent Office 3,450,348
Patented June 17, 1969

3,450,348
DUAL DRIVE FOR SWIVELING NOZZLES
Gerhard Kopp, Munich, Germany, assignor to Entwicklungsring, Sud GmbH, Munich, Germany, a corporation of Germany
Filed July 3, 1967, Ser. No. 650,722
Claims priority, application Germany, July 15, 1966, E 32,073
Int. Cl. F02k 1/24; B64d 27/20
U.S. Cl. 239—265.11                8 Claims

ABSTRACT OF THE DISCLOSURE

A common gear drive placed between deflecting nozzles of jet engines wherein gearing and connecting chains synchronize and equalize the deflection transmitted to said nozzles.

---

An objective of the invention is to provide a motor-and-pinion arrangement as the actuating mechanism for deflecting pipe segments of exhaust nozzles to insure synchronous operation of the jet deflectors arranged in side-by-side configuration.

The synchronous operation of jet deflectors is evidenced by the German patent specification 1,027,994. This known arrangement provides for the attachment of the motor for the actuating mechanism on the jet engine proper. However, since the jet engine features its maximum diameter at this point, a large opening is required in the bulkhead resulting in a reduction of its structural strength. Another disadvantage inherent in arrangements of this type is that the motor is subjected to considerable thermal stresses caused by the heat transfer and radiation at the surface of the jet engine. An additional and substantial drawback, especially with respect to weight, is the considerable layout of expensive components, since separate gear assemblies and synchronizers are required for each actuator. This invention is based on the task of eliminating the disadvantages of the known art by providing for an arrangement which facilitates access to and removal of components while protecting the driving device from thermal stresses and insuring easy access to the engine. For these purposes, a gear mechanism is provided for the synchronous operation of the two jet deflectors, which is driven by a dual motor arrangement and whose output is transmitted to a pair of chains each of which is connected to a deflector.

A further objective of the invention is to provide a deflector drive apparatus which works well with jet engines which are arranged in parallel or angular relationship with each other.

Another objective of the invention is to provide two identical interchangeable motors as the drive arrangement. Thus, a very high degree of reliability is obtained with respect to a potential failure (Fail Safe) of the deflecting mechanism as either one of the two motors is capable of actuating the whole arrangement in case of failure of the other. The gear assembly also causes the synchronous operation of both deflectors whether one or both of the motors is utilized.

The invention further provides for the placement of the dual motor drive along the center line of the fuselage structure where thermal and mechanical loads are minimum. As will be seen, such configuration guards the motor and the gear assembly from excessive wear.

A still further objective of the invention is to provide a drive assembly wherein all pneumatic, hydraulic and electric supply lines thereto are accessible to those integrated with the airframe. Thus, when removing the motors, it is no longer necessary to remove and replace hard-to-handle supply lines. This invention permits the integration of the supply lines within the airframe to the drive at the time of manufacture of the airframe subassemblies.

The invention also provides for the attachment of the chains used for the dual motor drive to the pipe segments by pintle means. Pintle arrangements permit the expeditious replacement of the chain in case of failure without disturbance to other components.

In order to compensate for the axial displacement of the attachment point of the chain at the engine due to thermal expansion, the pinion shaft for driving the duplex chains is designed to permit axial movement.

Another objective of the invention is to provide for an integral component comprising the shaft, the gear and the sprockets and for a two-armed reversible chain tightener coaxially to the pinion shafts and a coupling device for ganged operation of chain tighteners.

Another objective of the invention is to provide for an actuating mechanism for jet deflectors featuring optimum reliability, safety and economy.

These and other objects of the invention will become more apparent to those skilled in the art by reference to the following detailed description when viewed in light of the accompanying drawings, wherein:

FIGURE 2 is an enlarged partial section through the gear assembly of the arrangement according to FIGURE 1 in plan view showing an offset sprocket shaft permitting axial movement;

FIGURE 3 is a side view of the gear housing of the arrangement according to FIGURE 1;

FIGURE 4 is a side view of FIGURE 3;

FIGURE 5 is a sectional view along line V—V of FIGURE 6, of a configuration with jet engines aligned parallel to each other;

FIGURE 6 is a sectional view along VI—VI of FIGURE 5;

FIGURE 7 is an enlarged detail showing portions of FIGURE 6;

FIGURE 9 is a view of detail IX of FIGURE 1; and

FIGURE 10 is a side view of the detail according to FIGURE 9.

Figure 1:
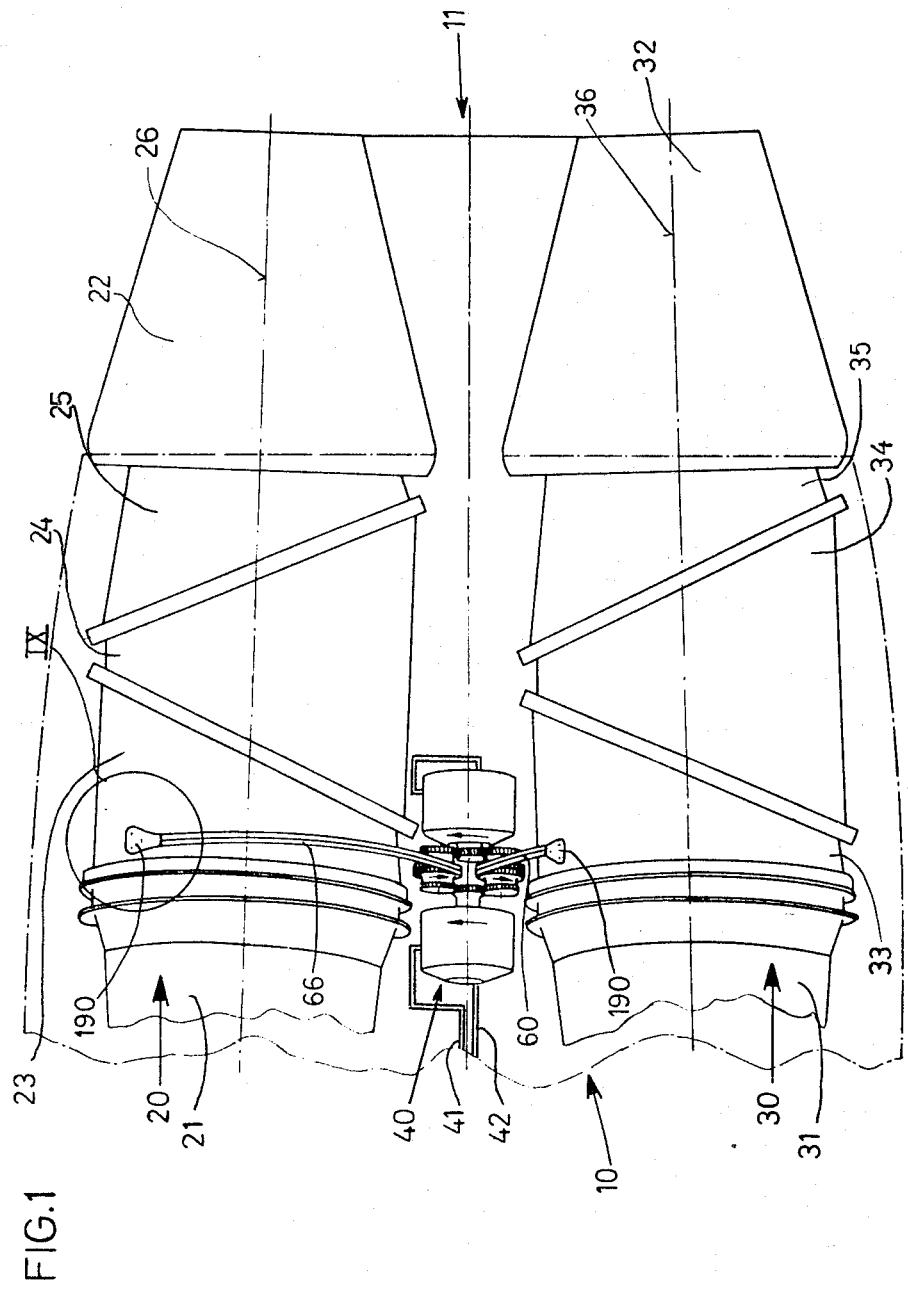
FIGURE 1 is a plan view of the arrangement of the invention in a configuration where the engines are angularly aligned relative to one another.

At the airframe 10 of an aircraft two jet engines 20 and 30 are arranged near the center line 11 of the fuselage structure. These jet engines feature swiveling pipe segments 23, 24, 25, 33, 34, and 35 between the engine compartments 21 and 31 and the nozzles 22 and 32. Between the jet engines 20 and 30 an actuating mechanism 40 is provided which is supplied by airframe-integrated electric, hydraulic and/or pneumatic lines 41 and 42 and by means of the duplex chains 60 and 66 rotates the pipe segments 23 and 33 in synchronous operation. The adjacent pipe segments 24, 25, 34, and 35 are also rotated, in the sense of the curvature of the flow duct, by devices which are not represented here, but evidenced in the Kopp et al. application U.S. Ser. No. 586,497, filed Oct. 13, 1966. FIGURE 2 is a configuration of the actuating mechanism 40, which essentially consists of three assemblies, i.e. a gear assembly 50 and the motors 70 and 80. The gear assembly 50 is driven by the motor 70 or the motor 80 or by both at the same time.

A shaft 52 is the main operating element of gear assembly 50. The shaft is provided with a gear 53 and at either end with pinions 54 and 55. The gear 53 is engaged on opposite sides with a pair of sprocket shafts 62. The sprockets 63 and 64 of shaft 62 are adapted to receive duplex chains. Note from FIGURE 2 that the sprocket shaft 62 is movable in the directions of its axis 61 and is aligned offset to axis 51 of shaft 52. This enables the shafts 21 to follow the linear expansions caused by high temperatures. Needle bearings 68 and antifriction bearings 69 are provided to minimize friction under any type of loading while at the same time ensuring smooth run without play.

The gear housing 56 (FIGURES 3 and 4) features a flange 57 at either end. Centering surfaces 58 provided on the flanges assist in aligning the gear housing to match the driving motors 70 and 80. For ease of mounting of the gear assembly, the flanges 57 are designed as separate components which are attached to the gear housing 56 by means of bolts 59. Mounting lugs 78 are located on the circumference of the gear housing. Before the final assembly, the flanged driving motors 70 and 80 are wrapped with thick layers of insulating band 90 to eliminate excessive temperature variations within the motors.

Figure 8:
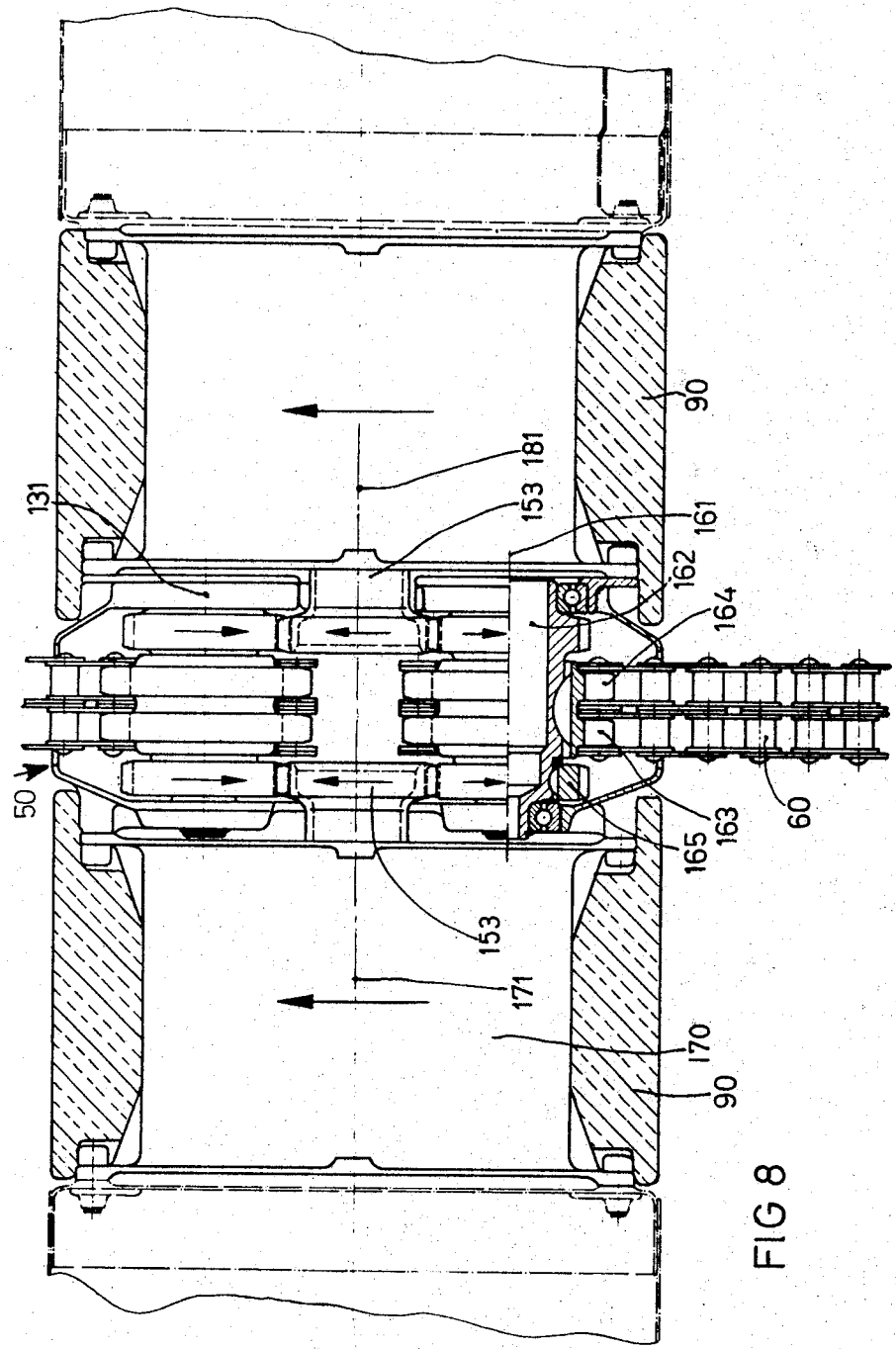
FIGURE 8 is a partial longitudinal section along line VIII—VIII of FIGURE 7.

The arrangement described above, especially the arrangement of the axially movable sprocket shaft 62, is particularly useful as an actuating mechanism where the axes 26 and 36 of the jet engines 20 and 30 are aligned at an angle relative to each other. In the case of parallel arrangements of the jet engines 120 and 130 as illustrated in FIGURES 5 through 8, offsetting of the sprocket shafts 162 is not required. The center lines 126 and 136 of the jet engines 120 and 130 as well as the center lines 161 of the shafts 162 for the sprockets 163 and 164 and the center lines 171 and 181 of the pinion shafts 172 and 182 of the motors 170 and 150 are all aligned parallel to one another. The other details and the operation of this configuration do not materially differ from the construction disclosed by FIGURES 1–4. The sprocket shafts 162 are driven through the gears 165 and 153.

For the attachment of the duplex chains 60, 66, 160 and 166 the pipe bodies 23 and 33 are respectively equipped with retaining plates 190 secured by rivets, screws etc. 191. Projecting retaining arms 192 are secured to the duplex chains 60, 66, 160 and 166 by means of pintles 193 which are secured by means of small safety chains 194. This arrangement ensures quick and easy installation and removal of the driving chains.

For tightening and maintaining tension in chains 60, 66, 160, and 166 commensurate with the respective sense of rotation, a chain-tightening device 200 is provided. The device consists of a case 201 which houses a movable piston 202. At either end, the piston 202 attaches two push rods 203 and 204 each of which is respectively connected to levers 205 and 215. The rotation is about the axes 161 of the shafts 162. Each end of the levers 205 and 215 respectively carries tension-adjusting rollers 206, 207, 208, and 209. In FIGURE 7 these rollers are shown in phantom. This chain-tightening device can be operated electrically, hydraulically or pneumatically.

As the bends, consisting of the pipe segments 23, 24, 25; 33, 34, and 35 start rotating, i.e. deflecting from the horizontal plane, the piston 202 is shifted accordingly. Thus, the elements 203, 204, 205 and 215 are moved through an angle a. The roller 206 is pressed against the chain 160, thus tightening the chain. The tension can be adjusted and is dependent on the pressure exerted on the piston 202. At the same time, the tension-adjusting rollers 207 and 208 are lifted off the chains 160 or 166 respectively, while the tension-adjusting roller 209 is pressed against the latter. This position is represented in FIGURE 7. As the bend is reset into the horizontal position, the piston 202 is pressed to the opposite side of the indicated position. This action lifts the tension adjusting rollers 206 and 209 off the chains 160 and 166 and the tension-adjusting rollers 207 and 208 are pressed against the chains 160 and 166.

What is claimed is:

1. The combination of an actuating mechanism with deflecting pipe segments of the exhaust nozzles or adjacent jet engines mounted on an aircraft fuselage comprising a power supply within said fuselage, a gear assembly mounted on said fuselage between said engines near said power supply, a motor means for driving said assembly mounted at said supply, chain means connecting said gear assembly to said pipe segments.

2. The combination recited in claim 1 wherein said gear assembly comprises a shaft rotated by said motor, a toothed gear affixed about said shaft, first and second sprocket shafts in driving engagement with said gear and said chain means includes first and second members respectively engaged with said sprockets.

3. The combination described in claim 1 wherein said motor means includes first and second motors disposed at opposite ends of said assembly.

4. The combination described in claim 2 wherein first and second pintle means secure said first and second chains respectively to said adjacent pipe segments.

5. The combination described in claim 2 wherein the longitudinal axes of said first and second shafts are angularly disposed with respect to the longitudinal axis of said shaft and support means mount said first and second sprocket shafts for movement along their respective longitudinal axes.

6. The combination as described in claim 2 wherein a chain tensioning means engages said first and second members.

7. The combination in claim 6 wherein said tensioning means comprises a cylinder, first and second piston rods extending from said cylinder and their outer ends in engagement with lever means.

8. The combination described in claim 7 wherein said lever means mounts said piston ends respectively about the axes of said sprocket shafts.

References Cited

UNITED STATES PATENTS

| | | | |
|---|---|---|---|
| 987,909 | 3/1911 | Pierce | 74—89.2 |
| 1,958,518 | 5/1934 | Maier | 74—217 |
| 2,904,167 | 9/1959 | Guess | 74—216.5 X |

MILTON KAUFMAN, *Primary Examiner.*

U.S. Cl. X.R.

60—232; 74—89.21, 222; 239—265.35